United States Patent
Hasui et al.

(10) Patent No.: US 6,535,655 B1
(45) Date of Patent: Mar. 18, 2003

(54) FIBEROPTIC POLARIZER AND METHOD OF MAKING THE SAME

(75) Inventors: Kenjiro Hasui, Shizuoka (JP); Toshihiko Ono, Fukuroi (JP); Toshio Sasaki, Kaegawa (JP); Hiroki Takahashi, Fukuroi (JP); Yoshiaki Takeuchi, Shizuoka (JP)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/747,069

(22) Filed: Dec. 21, 2000

Related U.S. Application Data (60) Provisional application No. 60/176,797, filed on Jan. 18, 2000.

(51) Int. Cl.[7] .................................................. G02B 6/00
(52) U.S. Cl. ............................. 385/11; 385/14; 385/65; 385/73; 385/31
(58) Field of Search ............................. 385/11, 65, 73, 385/75, 14, 88, 89, 92, 31, 39

(56) References Cited

U.S. PATENT DOCUMENTS

| | | | |
|---|---|---|---|
| 3,208,860 A | * 9/1965 | Armistead et al. | 106/54 |
| 4,304,584 A | 12/1981 | Borrelli et al. | 65/30.11 |
| 4,701,011 A | 10/1987 | Emkey et al. | 385/34 X |
| 4,818,080 A | * 4/1989 | Glasheen | 359/281 |
| 4,864,869 A | * 9/1989 | Glasheen | 73/861.352 |
| 5,706,371 A | * 1/1998 | Pan | 385/11 |

FOREIGN PATENT DOCUMENTS

| | | | |
|---|---|---|---|
| EP | 751 410 | 1/1997 | 385/11 |
| JP | 11-23845 | 1/1999 | 385/11 |
| WO | 99/59006 | 11/1999 | 385/11 |

OTHER PUBLICATIONS

K. Hasui et al., "A High Performance Dichroic Glass Polarizer With A Thickness of 15–35 $\mu$m", Jpn. J. Appl. Phys. vol. 39 (2000) pp. 1494–1496.

K. Shiraishi et al., "Vertical Integration Technology For Fiber–Optic Circuit", Optoelectronics, vol. 10, No. 1, pp. 55–74, Mar. 1995.

Sumitomo Osaka Cement, Laminated Polarizer, Sumitomo Osaka Cement Co., Ltd.

* cited by examiner

*Primary Examiner*—Brian Healy
(74) *Attorney, Agent, or Firm*—Vincent T. Kung (57) ABSTRACT

A fiber-optic polarizer made by a process comprised of providing a substrate, coupling or embedding an optical single mode fiber to the substrate, making a narrow trench across the fiber at an angle, thereby bifurcating the fiber core into a first fiber core end and a second fiber core end, inserting and securing a thin polarizing material of a monolithic, non-laminated structure into the narrow trench, such that a light spot size emitted from a first fiber core is completely encompassed by the polarizing material, and the light spot size emerging from the polarizing material is substantially collected within the mode field diameter of a second fiber core. The narrow trench having a width of about 30–50 $\mu$m, and the polarizing material having a thickness of about 15–50 $\mu$m. The polarizing material having a monolithic composition. Moreover, the inventive polarizer has good reliability in terms of mechanical durability and weathering, since polarizer is fabricated on substrate in which optical path is entirely sealed. This is a process that eliminates the need to use specialized fibers or fibers that are specially treated such as those with thermally expanded cores (TEC). The process is also an alignment-free process that enables easier and faster mass-fabrication. This process produces multiple polarizers at a time.

41 Claims, 5 Drawing Sheets

Coupling loss Fiber (10, 20, 20μm) with 1.55 μm n=1.506

FIG. 5

FIBEROPTIC POLARIZER AND METHOD OF MAKING THE SAME

CLAIM OF PRIORITY

This Application claims priority to a Provisional Application No. 60/176,797, entitled FIBEROPTIC POLARIZER, filed on Jan. 18, 2000 in the U.S. Patent and Trademark Office.

FIELD OF THE INVENTION

The invention relates to optical functional devices that are integrated directly into optical fibers for use in telecommunication systems. More particularly, the invention relates to a fiber-optic polarizer device and a method of making the device.

BACKGROUND OF THE INVENTION

In optical communication systems, several kinds of optical functional devices, such as isolators, switches, filters, and amplifiers must be inserted between optical fibers. Most in-line optical devices use lens elements to collimate a light beam from an incoming single-mode fiber (SMF) and focus it on an out-going SMF, where functional elements are placed in between two fibers. As a result, precise alignment (within 0.1–0.5 $\mu$m) between SMF and lens is required and subsequent alignment between the two facing lenses is required to make collimate system. Those alignments are extremely complicated and troublesome.

The use of very thin elements makes possible the production of optical devices without the need for expensive fiber collimator system using lens elements to lessen alignment problems in order to maintain high light throughput. Coupling loss between two optical fibers mainly depends on optical distance between the two fiber-ends, and the core diameter of each fiber. For any integrated fiberoptic device, one of the goals is to shorten the optical path-length in order to decrease coupling loss caused by diffraction. These and other aspects of vertical integration technology, as it is known are described by Shiraishi et al., in *Vertical Integration Technology for Fiber Optic Circuit*, OPTOELECTRONICS, Vol. 10, No. 1, pp.55–74, March 1995. Shiraishi's article discusses an approach that focuses on making fiber-integrated isolators, where the optical components are relatively thick, having several hundred microns. Therefore, employment of a fiber having a large core diameter, such as a TEC (Thermally Expanded Core)-fiber, is essential to suppress coupling loss in such a device.

Generally, two types of fiber-optic polarizers are known. A first type consists of a thick (>0.1 mm thick) polarizer material that is placed in between fiber collimator system. In this first type of polarizer, many optical components that require high structural preciseness are used, so that the cost is increased. In such a polarizer, one of the lenses collimates a light beam from an incoming fiber and the other lens focuses the light on an out-going fiber. Because of the rather bulky arrangement and large thickness of the optical elements, such a polarizer design cannot avoid large coupling losses between the two fibers without the use of a fiber collimator system that contains lenses. Precise alignment (0.1–0.5 $\mu$m) between lens and fiber is required and subsequent precise alignment between the two facing lenses that is fixed with each fiber is also required to produce the collimator system for this polarizer. Moreover, costly packaging of such a polarizer is essential to maintain optical alignment, as well as performance reliability.

In order to avoid difficult alignment problems, workers proposed a second type of fiberoptic polarizer in which lenses are not used. This second type of lens-free device uses a laminated polarizer material, known commercially as LAMIPOL by Sumitomo Osaka Cement (SOC). In an embodiment of this kind of fiberoptic polarizer, LAMIPOL is placed in between the end facets of two optical fibers. LAMIPOL has a structure in which metal and dielectric layers are alternately laminated with periodicity, and is made by alternatively depositing Al (or Ge) and $SiO_2$ films with RF sputtering. LAMIPOL has a thickness of typically about 30 $\mu$m. Due to the thinness of the material, lens elements are not necessary since the coupling loss is negligibly small.

Use of LAMIPOL in lens-free devices, however, has several problems. One of the major concerns is difficulty in handling for alignment during the fabrication process. As Sasaki et al., in Japanese Patent No. 99-23845, points out, inserting LAMIPOL into a gap formed in a waveguide results in low yield because of the inherent difficulties associated with handling and breakage of LAMIPOL. In particular, due to its relatively small physical size (1.6 mm×1 mm square or 1.6 mm×4.6 mm square) and its brittleness, handling pieces of LAMIPOL in the alignment process leads to unacceptable levels of breakage.

Although Sasaki et al. improved the handling aspect of fabrication by increasing the physical size of a piece of LAMIPOL, they failed to solve another inherent problem of LAMIPOL, that is, it has a very small optical aperture (0.1 mm×1 mm square or 0.1 mm×4.6 mm square). This optical aperture is located at an end of a lateral side of a piece of LAMIPOL. Therefore, vertical alignment is essential for LAMIPOL to be inserted into a gap. As mentioned before, LAMIPOL has a structure where metal and dielectric layers are alternately laminated with periodicity. Since the absorbing cross-section of a laminated structure depends strongly on the incident angle, another problem with Lamipol is its inherently small acceptance angle. The width of a gap needs to have a relatively tight tolerance for insertion of the LAMIPOL. When the width of a gap between fiber ends is larger than the thickness of a piece of LAMIPOL, LAMIPOL can be accidentally tilted into an incorrect angle relative to the normal of waveguide orientation. This tilting has a significant effect upon return and insertion losses. Ordinarily, arranging optical components at a tilted angle against the normal of the optical axis in fiber-optic applications has been an effective configuration to improve return loss. But, because the acceptance angle of LAMIPOL is inherently small, a tilted configuration results in an increase in insertion loss. Theoretical calculation shows that an angle greater than approximately 2.5° is required to attain a return-loss of up to approximately 55 dB when LAMIPOL is inserted in between two ends of SMF. Given the inherently small acceptance angle of LAMIPOL, a trade-off must be made between either improving return loss or reducing insertion loss. Hence, in a LAMIPOL fiber polarizer when the LAMIPOL is placed at an angle to improve the return loss, insertion loss increases. Thus, it may be impossible to use LAMIPOL to reduce return loss, because it may be impossible to insert LAMIPOL at an angle in a tilted configuration.

An alternate example of this second type of polarizer is disclosed by J. Stone in European Patent Application, EP 0751410A2. Stone proposed sandwiching a polished piece of prefabricated dichroic glass polarizer using a glue, having thickness of less than 50 $\mu$m, in between end facets of two fibers. The fabrication process for the Stone example entailed thinning a piece of polished dichroic glass polarizer, affixing the polarizer to one end facet of a first fiber and in a subsequent step optically coupling an end facet to a second fiber to the polarizer. This process is accomplished using the aid of a rotary connector or alignment sleeve, which has an inherent loss due to residual misalignment. Although residual misalignment may be slightly suppressed with rotation of each fiber, other complications would arise. In order to rotate the each fiber, end facets of each fiber need to be perpendicular to the optical axis, which means that the polarizer material needs to be sandwiched perpendicularly to the optical axis. This configuration forecloses the use of an angled placement of the polarizer material to reduce return loss. Therefore. since Stone's polarizer need to be set perpendicular to the optical axis, this configuration has inherent problems of return loss. Further, the refractive index of the glue depends on the temperature difference that would result in index mismatch. In addition, more numerous optical components are required, and Stone's process is rather slow and can make only one polarized fiber at a time.

In view of the foregoing discussion, a new design for vertical integration technology of fiber optic polarizer devices is needed. Our invention, is just such a more cost-effective design, which provides an easier way of mass fabrication.

SUMMARY OF THE INVENTION

A fiber-optic polarizer device made by a process comprised of providing a substrate, coupling or embedding an optical fiber to the substrate, making a narrow trench across the fiber and fiber core at an angle, thereby bifurcating the fiber and its core into a first fiber core end and a second fiber core end, inserting and securing a thin polarizing material of a non-laminated structure, such as a dichroic glass polarizer, into the narrow trench, such that a light spot size emitted from a first fiber core is completely encompassed by the polarizing material, and the light spot size emerging from the polarizing material is substantially collected within or equal to the mode field diameter of a second fiber core. This is a process that eliminates the need to use specialized fibers or fibers that are specially treated such as those with thermally expanded cores (TEC). The process is also an alignment-free process that enables easier and faster mass-fabrication. This process produces multiple polarizers at a time. Additionally, the inventive polarizer exhibits a high degree of reliability in terms of mechanical strength and durability to weathering, since the polarizer is fabricated on a substrate in which the optical path is entirely sealed.

DETAILED DESCRIPTION OF THE INVENTION

Our invention encompasses in one aspect a fiber-optic polarizer that comprises at least one optical fiber embedded in a substrate. The fiber and its fiber core is transversely bifurcated by a narrow trench into a first fiber portion having a first fiber core and a second fiber portion having a second fiber core, and a thin polarizing material positioned in the narrow trench. A light spot size emission from a first fiber core is encompassed by the polarizing material, and a light spot size emerging from the polarizing material is substantially incident upon a second fiber core. The each fiber core is substantially constant or equivalent in diameter and the polarizing material is not of a laminated structure, but rather is preferably "monolithic" or exhibits "dichroism." In another aspect, the invention relates to a method for making such a fiber-optic polarizer. The method comprises providing a substrate, coupling an optical fiber to the substrate. making a narrow trench across the fiber at an angle, thereby, bifurcating the fiber and its core into a first fiber end and fiber core, and a second fiber end and fiber core. Then inserting and securing a thin, "monolithic" or "dichroic" polarizing material of a non-laminated structure into the narrow trench. The placement of the polarizing material is as such that a light spot size emitted from a first fiber core is mostly or completely encompassed by the polarizing material, and the light spot size emerging from the polarizing material is substantially collected within the mode field diameter of a second fiber core.

Figure 1A:
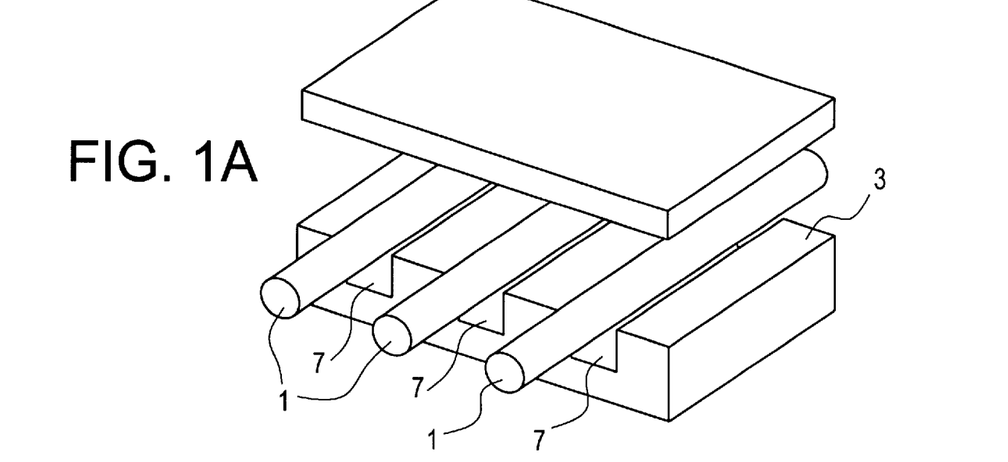
FIG. 1A shows an embodiment of the fabrication process for a fiber-optic polarizer using a thin polarizing material, where an array of optical fibers is coupled or embedded in a substrate.
Figure 1B:
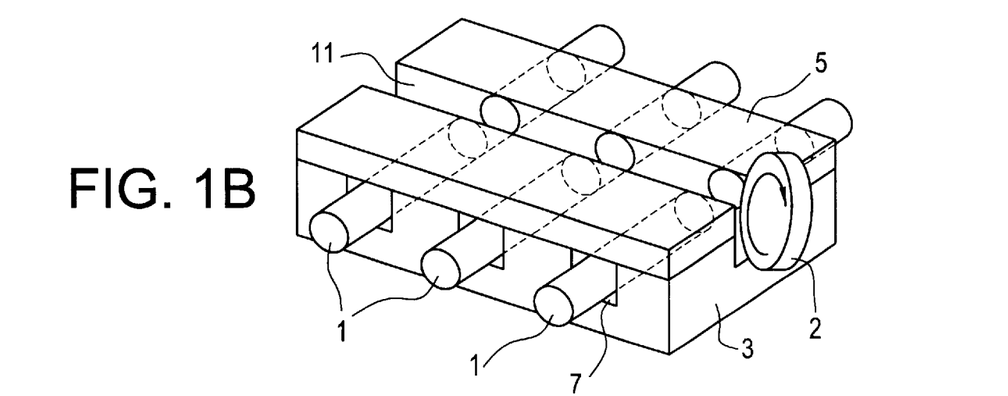
FIG. 1B shows an embodiment of the fabrication process for a fiber-optic polarizer using a thin polarizing material, where an array is cut at an angle to the optical axis of the fibers, to form a narrow trench.
Figure 1C:
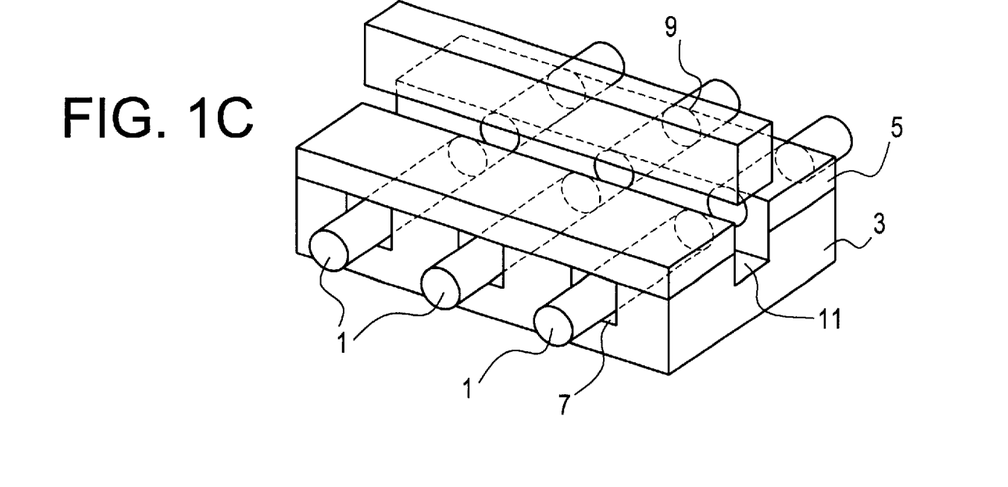
FIG. 1C shows an embodiment of the fabrication process for a fiber-optic polarizer using a thin polarizing material, where a thin polarizing is inserted into the narrow trench made by the cut shown in FIG. 1B.
Figure 2:
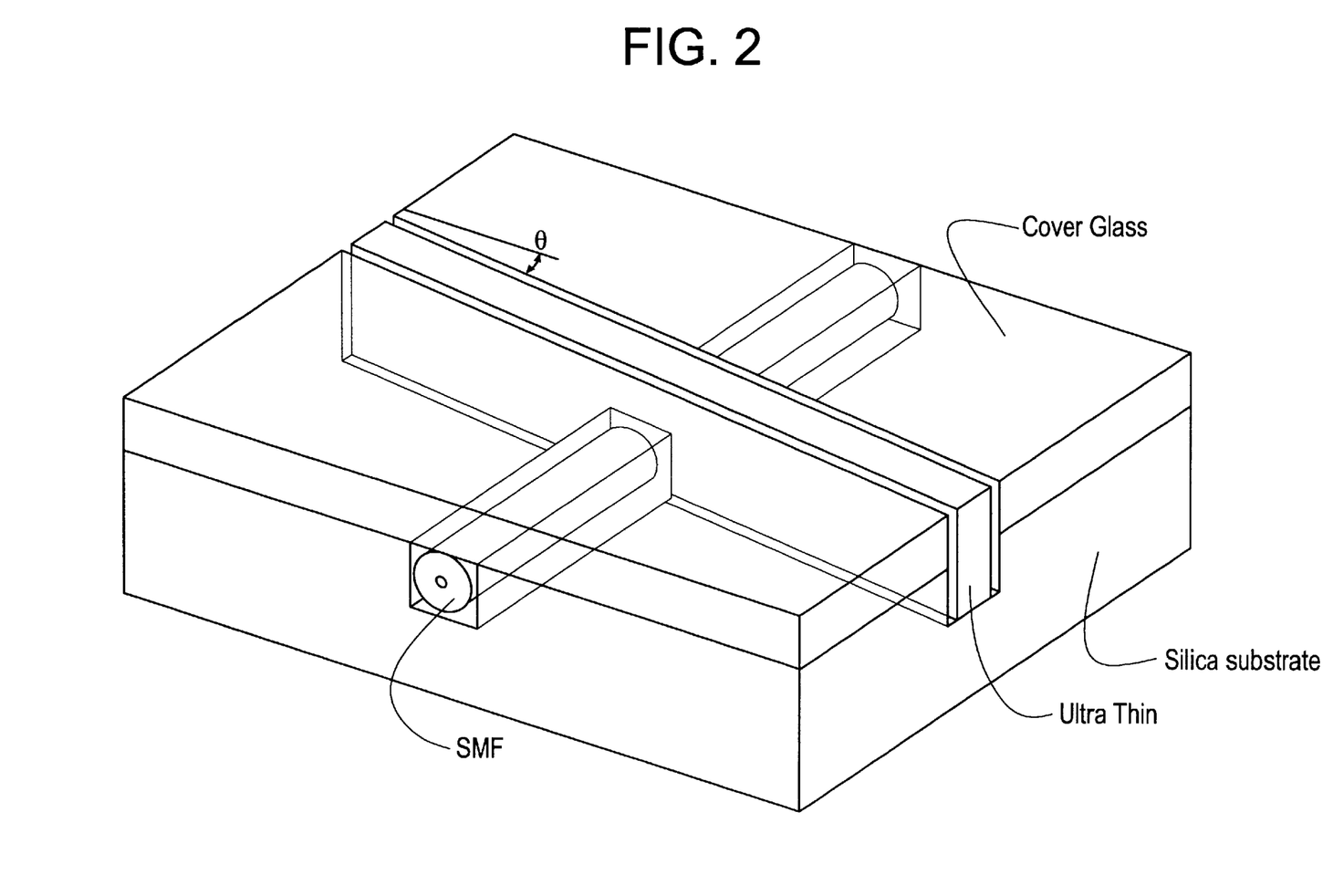
FIG. 2 shows an embodiment of the fabrication process for a fiber-optic polarizer using a thin polarizing material.

As shown in accompanying FIGS. 1A–1C, the proposed polarizer device is realized by inserting a thin polarizing material into a narrow trench or gap in a waveguide at an angle in the range of about 0–10 degrees relative to the perpendicular of the fiber. More preferably, the angle ranges from about 3 or 4–8 or 9 degrees. FIGS. 1A–1C shows an embodiment of the fabrication process for the fiber-optic polarizer using a thin polarizing material. First, a fiber or an array of fibers is prepared. FIG. 1A illustrates an array of optical fibers embedded in a substrate. The array is then cut. FIG. 2A depicts the dicing of the assembled fibers across their optical axis at a predetermined angle by a blade, thus forming a narrow trench. A thin polarizing material is then inserted. FIG. 1C displays a thin polarizing material inserted into the narrow trench, and affixed by refractive index matching optical adhesive. This is an essentially alignment free process.

The polarizing material is affixed to the substrate having at least one optical fiber embedded within. This is accomplished, for example, with an index matching ultraviolet (UV) curable optical adhesive. such as #9389 by NTT-AT. The adhesive should have a refractive index that matches to that of the fiber core. Other media or adhesive such as an index-matching oil or epoxy could also be employed. The index-matching adhesive also ensures that the end facet of the fiber core is not exposed to air. It is desirable that the fiber is embedded and the waveguide not be exposed to air. This would reduce light attenuation and make it unnecessary to package the inventive polarizer device in expensive packing to protect the device from the deleterious effects of the atmosphere. In addition, the inventive polarizer has high mechanical strength, since the polarizer is made on a substrate. Moreover, the number of optical components needed to fabricate the polarizer device is very low. The components comprise a substrate, a cover glass, a thin polarizer, and an optical fiber. Multiple fiberoptic polarizers, such as used in an arrayed, can be fabricated at a time with an alignment free process. Of course. a single fiberoptic polarizer can be made in an array process with subsequent separation of individual polarizer units.

The thin polarizing material is a glass exhibiting dichroic ratios of up to 40 or greater and containing silver halide particles aligned along a common axis, the glass is characterized as being either phase separable or photochromic. When a phase-separable glass is used as the thin polarizing material, the glass has a base composition, in weight percent, consisting essentially of: 1–15% $Al_2O_3$, 20–35% $B_2O_3$, 5–12% alkali metal oxide, and the remainder $SiO_2$, with the proviso that where $Al_2O_3$ is present in amounts greater than about 5% at least 1% of a phase separating agent will be included in the composition.

Alternatively, when a photochromic glass is employed, the glass has a composition, in weight percent on an oxide basis, consisting essentially of: 4–26% $Al_2O_3$, 4–26% $B_2O_3$, 40–76% SiO2, and at least one alkali metal oxide selected from the group of 2–8% $Li_2O$, 4–15% $Na_2O$, 6–20% $K_2O$, 8–25% $Rb_2O$, and 10–30% $Cs_2O$; at least one halogen in a minimum effective proportion of 0.2% Cl, 0.1% Br, and 0.08% I, and a minimum of silver in a proportion of 0.2%, where the effective halogen is Cl, 0.05% where the effective halogen is Br; but the glass contains at least 0.08% I, the sum of the base glass components, halogen, and silver constitute at least 85% by weight of the composition. Another type of a photochromic glass can have a composition, in weight percent on an oxide basis, consisting essentially of: 5–25% $Al_2O_3$, 14–23% $B_2O_3$, 20–65% $SiO_2$, 0–25% $P_2O_5$, 0–2.5% $Li_2O$, 0–9% $Na_2O$, 0–17% $K_2O$, 0–6% $Cs_2O$, 8–20% $Li_2O+Na_2O+K_2O+Cs_2O$, 0.004–0.02% CuO, 0.15–0.3% Ag, 0.1–0.25% Cl, and 0.1–0.2% Br, the molar ratio of alkali metal oxide:$B_2O_3$ ranges between about 0.55–0.085, where the composition is essentially free from divalent metal oxides other than CuO, and the weight ratio of Ag:(Cl+Br) ranges from about 0.65–0.95.

An even more preferred polarizing material that could work quite well in our present invention is the very thin glass articles such as that described in published Patent Application WO99/59006, which is herein incorporated by reference. WO99/59006 relates in part a method for making silver-containing glass and ultra-thin polarizing glass articles made from such glass. The polarizing glass is of a uniform polarizing consistency, as opposed to a laminated structure. That is, the glass should be monolithic, in that it has dispersed within, across its entire breadth and thickness, elongated submicroscopic metal particles. In this respect, the polarizing material should be of a non-laminated structure. The metal particles have a long axis such that the glass preferentially absorbs polarizing components of light that are parallel to the long axis. Hence, it permits high transmission of light, which vibrates perpendicular to the long axis. Further, the polarizing glass is essentially free of metal halide particles, which tend to impart certain undesired optical properties to the glass, such as light scattering caused by the presence of tiny halide crystals embedded in the glass, or unwanted photochromism.

The polarizing material can be preferably a single layer light polarizing device free of adjacent non-polarizing regions. For example, a glass commercially known as Ultra-Thin™ Polarcor by Corning could be used. This type of glass, as disclosed in WO99/59006, is made according to a method comprising a number of steps. First, provide a polarizing glass comprising a first polarizing layer and a non-polarizing region, wherein the polarizing layer contains elongated metal particles and the non-polarizing region contains metal halide particles. Second, bond the first polarizing layer of said polarizing glass to a substrate. Third, remove the non-polarizing region to expose said first polarizing layer, and then, separate said first polarizing layer from the substrate to form an ultra-thin polarizing glass. After the removal step, the polarizing glass is cut into wafers, each having predetermined dimensions of length and width with a thickness of 10–50 μm. A wafer can have a thickness, for example, of about 10, 15, 20, 25, 30, 35, or 40 μm. Additionally, each wafer has a large optical aperture and good thermal durability. Apertures as large as 10 mm×10 mm square can be realized. (K. Hasui et al., *Jpn. J. Appl. Phys.*, 2000, v. 39, pp.1494–1496.) The polarizing glass exhibits a contrast ratio greater than 25 dB at a wavelength greater than 650 nm. For instance, the polarizing material has a contrast ratio greater than 40 dB at 1.54 μm wavelength.

Figure 4:
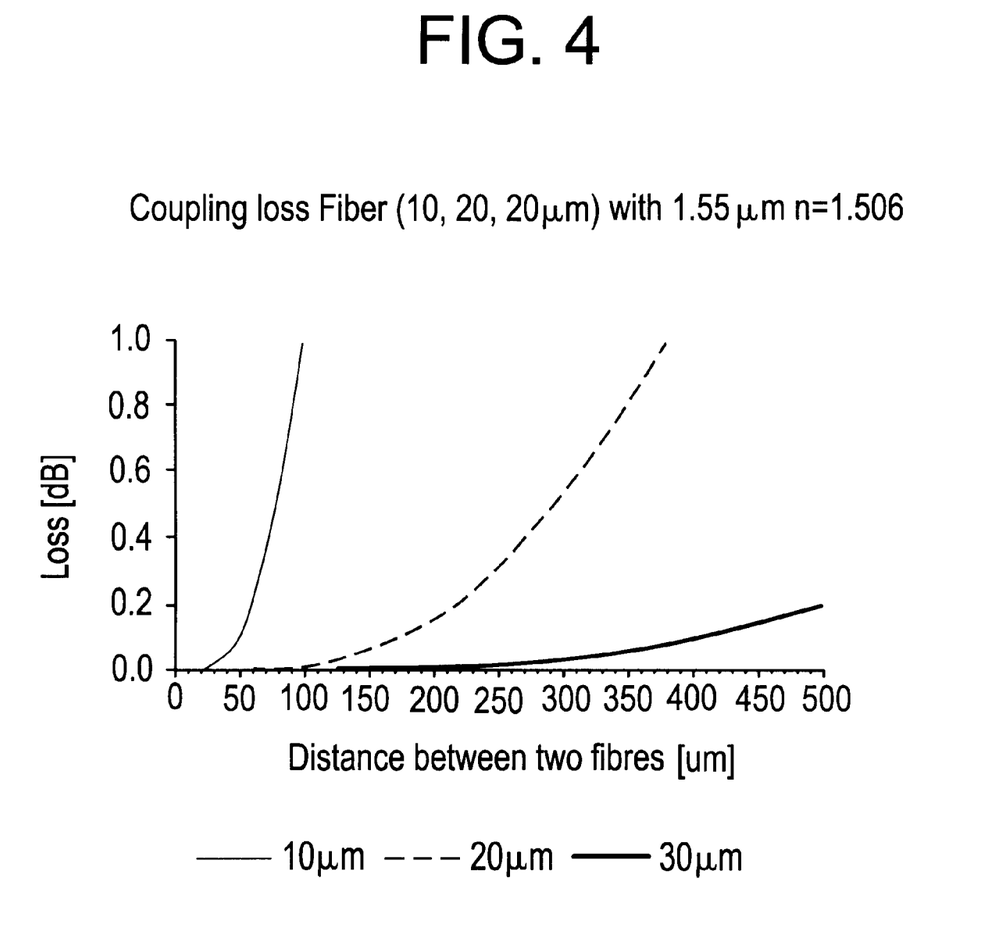
FIG. 4 is a graphic plot that shows the relationship between optical loss versus distance between the end facets of two fibers, for three sets of fibers having varying diameters.

Due to the thin polarizing material having a significantly larger aperture, as compared to prior art materials, the assembly process does not require time-consuming alignment. As stated before, the closer together the end facets of two fibers are to each other, or in other words the narrower the gap between them, the less optical loss encountered by a fiber-optic device. The narrow trench of the present invention has a width of less than or equal to 70 μm, but preferably 60–50 μm. More preferably the trench has a width of about 10–20–30 μm, up to about 50 μm. The small the distance between two fiber-facet ends, the less loss is experienced. FIG. 4 shows this dependent relationship for calculated coupling losses and the distance of a gap in which a piece of glass polarizer is sandwiched between two optical fibers having different mode field (10, 20, and 30 μm) diameters. The principle is well illustrated, coupling loss significantly increases with increasing distance.

Although a larger mode field diameter is effective for suppressing coupling loss, the optical fibers employed in the inventive polarizer device need not undergo specialized treatment, such as heating, to expand the diameter of their cores. Heat treatment of a fiber for a thermally expanded core fundamentally requires precious temperature control for temperatures as high as 1400° C., so as not to damage the fiber. This results in high fabrication costs. The present inventive device and process do not require the use of TEC-fiber, because the thickness of the polarizing material used is very small, so the coupling loss is negligible.

An advantage of the present design over previous devices may be that any ordinary single mode optical fiber, which has a core that is substantially constant in diameter, can be used without fear of substantial diffusion or loss of light. (The term "substantially constant" refers to an optical fiber that has a core diameter that is within normal manufacturing tolerances, which are well known.) In other words, the diameter of a fiber core does not have a significantly tapered section, and does not vary by more than 50%, or by more than 10–15–25%. Typically, the core diameter of ordinary single mode fiber is approximately 10 μm.

As described above, envisioned embodiments of the invention may use a single fiber or an array of fibers. An array permits one to fabricate more than one polarized fiber at a time and at a fast rate. FIG. 2 shows one embodiment of the inventive fiber-optic polarizer. The fibers are placed in parallel grooves in a substrate and a narrow trench is cut at an angle (θ) between 0–10 degrees (preferably 3° to 9°) relative to the normal of the optical axis of each fiber. The substrate can be made from a silica glass. When the thin polarizing material is inserted at an angle or tilted, return loss, or back reflection, is virtually eliminated. For good optical performance, the polarizing material being inserted should not be sensitive to a shift in the incident angle. A monolithic-type, dichroic glass polarizer, such as UltraThin™ by Corning Inc., satisfys this condition since its performance is generally not sensitive to off-normal angle shift of incident angle. The return loss in the inventive fiber-optic polarizer with UltraThin™ inserted was measured to be in a range of about 38–50 dB, where angles was in the range of 0 to 8 degrees. Insertion loss of those polarizers was measured to be 0.2–0.5 dB. In addition, since the difference in refractive index between thecore of an ordinary SMF and the polarizing material tends to be small (Δn=~0.07), it is not necessary to compensate for an offset of optical axis due to the angled tilting. Moreover, an optical loss caused by Fresnel reflection is negligibly small because of the small difference in refractive index between the core of an ordinary SMF and the polarizing material. Thus, it is not necessary to use antireflection coating on the polarizing material, because of the negligibly small loss, since the angled bisection of the optical fiber effectively eliminates return loss. An optical polarizer material, such as UltraThin™, has a contrast ratio greater than 30 dB. At a wavelength of interest (1,550 nm), the contrast ratio of UltraThin™ was ranges from about 33–48 dB, when the polarizer material is tilted at an angle from 0 to 8 degrees. Insertion loss for this material was measured to be less than 0.06 dB.

Figure 3:
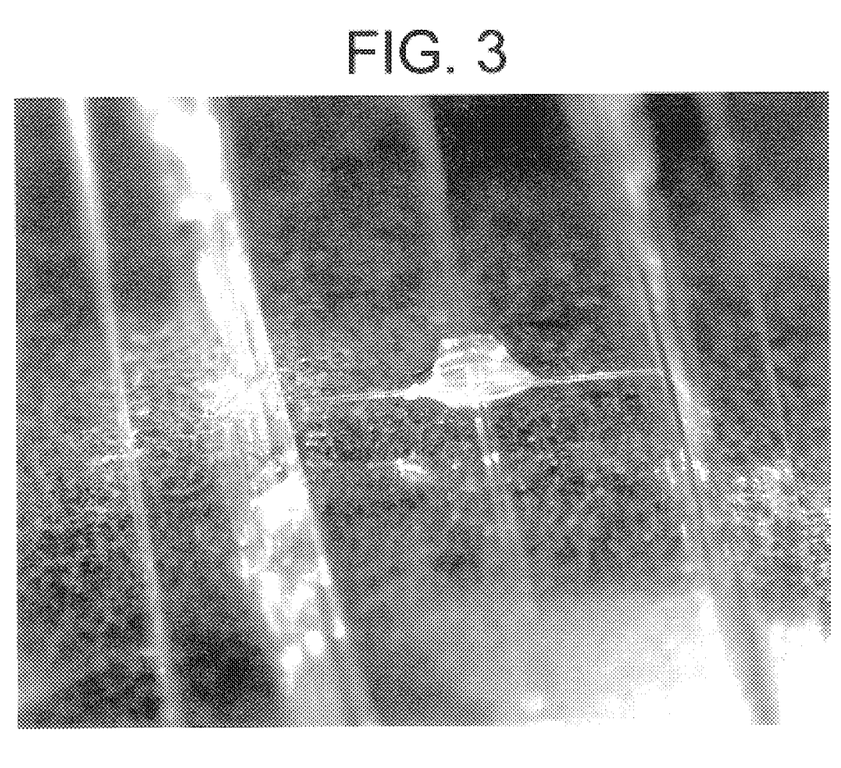
FIG. 3 shows a detailed section of a microscopic photograph of the fiber optic polarizer shown in either FIGS. 1A–1C, or FIG. 2.
Figure 5:
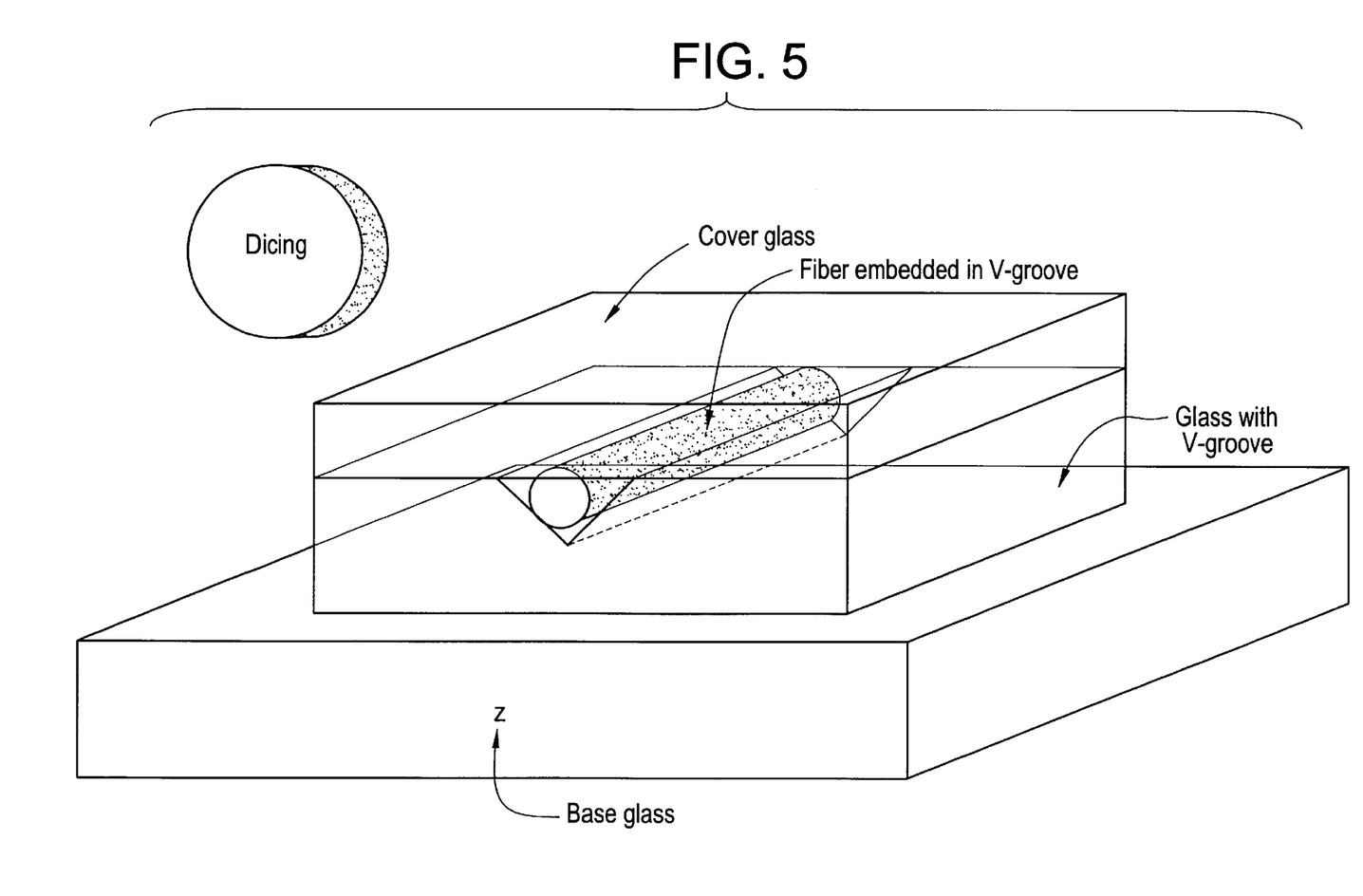
FIG. 5 shows an alternate embodiment of a fiber-optic polarizer having V-grooves, using a thin polarizing material.

As an alternate embodiment of the present invention, a fiber-optic polarizer device is made of a single fiber coupled in a substrate with a V-groove. A polarizer made according to the fabrication scheme is illustrated in FIG. 5. A V-groove is formed in planar piece of fused silica glass substrate, of approximately 0.6 mm thick by means of a precision dicing machine with V-groove blade. The angle of the cut is 90° and depth of the groove is 151 μm, respectively. Alternatively, a V-groove can be made with a 60° cut angle and 187 μm depth. Then, once prepared, a bare single mode fiber is laid in the groove with thermally curable epoxy. Before curing, a 0.12 mm thick glass cover is placed on the top of fused silica glass in order to settle the fiber in the groove. Then, this glass cover is adhered to the glass substrate, with the same epoxy. Subsequently, the epoxy is hardened on a hot plate. To insert an Ultra-Thin™ having a thickness of about 36 μm, a trench is made with a two-step cutting using a 30 μm width blade. Alternatively, we can also use a one step cutting using a 30 μm width blade. To eliminate return loss, the angle of the trench is set at 4° relative to the fiber facet. FIG. 3 shows a microscopic photograph of the aforementioned fiber-optic polarizer with a narrow trench cut at 4° relative to normal of the optical axis of a fiber. After being formed, the gap of the narrow trench is measured to be approximately 39 μm as the distance of two fiber core facets by an Optical Low Coherency Reflectometer (OLCR) instrument. An UV-curable, index-matching adhesive is then poured into the trench and a 1 mm×2 mm piece of Ultra-Thin™ is inserted into the trench. The adhesive is exposed to UV-light to cure. It should be understood that the foregoing represents illustrative embodiments of the invention, and is not intended to embody all aspects of the invention.

Although the present invention has been described by way of a limited number of embodiments, it will be apparent to those skilled in the art that various modifications and variations can be made to the present glass compositions without departing from the spirit and scope of the invention. Therefore, unless such changes and modifications otherwise depart from the scope of the present invention, they should be construed as included herein.

We claim:

1. A method for making a fiber-optic polarizer device comprising:

providing a substrate; coupling an optical fiber to the substrate; making a narrow trench across the fiber and its core at an angle, thereby bifurcating the fiber into a first fiber end having a first fiber core and a second fiber end having a second fiber core; inserting and securing a thin polarizing material of a non-laminated structure into the narrow trench, filling said narrow trench with an index-matching medium.

2. The method according to claim 1, wherein the polarizing material is secured by a refractive index matching optical adhesive.

3. The method according to claim 1, wherein the fiber and its core is bifurcated at an angle in the range of 0 to 10 degrees relative to the perpendicular of the fiber.

4. The method according to claim 1, wherein the fiber and its core is bifurcated at an angle in the range of 3 to 9 degrees relative to the perpendicular of the fiber.

5. The method according to claim 1, wherein the narrow trench has a width of less than or equal to 60 μm.

6. The method according to claim 1, wherein the narrow trench has a width of 20–50 μm.

7. The method according to claim 1, wherein the return loss is measured to be 38 dB or greater.

8. The method according to claim 1, wherein the polarizer has a contrast ratio greater than 30 dB.

9. The method according to claim 8, wherein the polarizer had a contrast ratio of 40 dB.

10. The method according to claim 1, wherein the polarizing material has a thickness of approximately 10–40 μm.

11. The method according to claim 1, wherein the polarizing material is a glass exhibiting dichroic ratios up to 40 and containing silver halide particles aligned along a common axis, the glass is characterized as being either phase separable or photochromic.

12. The method according to claim 11, wherein the polarizing material is a photochromic glass having a composition, in weight percent on an oxide basis, consisting essentially of: 5–25% $Al_2O_3$, 14–23% $B_2O_3$, 20–65% $SiO_2$, 0–25% $P_2O_5$, 0–2.5% $Li_2O$, 0–9% $Na_2O$, 0–17% $K_2O$, 0–6% $Cs_2O$, 8–20% $Li_2O+Na_2O+K_2O+Cs_2O$, 0.004–0.02% CuO, 0.15–0.3% Ag, 0.1–0.25% Cl, and 0.1–0.2% Br, the molar ratio of alkali metal oxide:$B_2O_3$ ranges between about 0.55–0.085, where the composition is essentially free from divalent metal oxides other than CuO, and the weight ratio of Ag:(Cl+Br) ranges from about 0.65–0.95.

13. The method according to claim 11, wherein the polarizing material is a photochromic glass having a composition, in weight percent on an oxide basis, consisting essentially of: 4–26% $Al_2O_3$, 4–26% $B_2O_3$, 40–76% SiO2, and at least one alkali metal oxide selected from the group of 2–8% Li2O, 4–15% Na2O, 6–20% K2O, 8–25% Rb2O, and 10–30% Cs2O; at least one halogen in a minimum effective proportion of 0.2% Cl, 0.1% Br, and 0.08% I, and a minimum of silver in a proportion of 0.2%, where the effective halogen is Cl, 0.05% where the effective halogen is Br; but the glass contains at least 0.08% I, the sum of the base glass components, halogen, and silver constitute at least 85% by weight of the composition.

14. The method according to claim 11, wherein the polarizing material is a phase separable glass having a base composition, in weight percent, consisting essentially of: 1–15% $Al_2O_3$, 20–35% $B_2O_3$, 5–12% alkali metal oxide, and the remainder $SiO_2$, with the proviso that where $Al_2O_3$ is present in amounts greater than about 5%, at least 1% of a phase separating agent will be included in the composition.

15. The method according to claim 1, wherein the polarizing material is a polarizing glass having a thickness of 10–50 μm and containing elongated metallic silver particles throughout said thickness, said polarizing glass being characterized in that said glass exhibits an extinction ratio greater than 25 dB at a wavelength greater than 650 nm.

16. The method according to claim 15, wherein said elongated metallic silver particles have a long axis, characterized in that said elongated metallic silver particles preferentially absorb the polarizing component of light that is parallel to said long axis to permit high transmittance of light which vibrates perpendicular to said long axis.

17. The method according to claim 1, wherein the polarizing material is a polarizing glass which is essentially free of metal halide particles.

18. The method according to claim 1, wherein a light spot size emitted from the first fiber core is completely encompassed by the polarizing material, and a light spot size emerging from the polarizing material is substantially collected within a mode field diameter of the second fiber core.

19. A fiber-optic polarizer comprising: at least one optical single mode fiber embedded in a substrate, the fiber and its core being transversely bifurcated by a narrow trench into a first fiber portion having a first fiber core and a second fiber portion having a second fiber core, and a thin polarizing material positioned in the narrow trench, wherein the polarizing material is of a non-laminated structure and has a contrast ratio greater than 30 dB, containing elongated metallic particles, the fiber and its core is bifurcated at an angle in the range of 0 to 10 degrees relative to the perpendicular of an optical axis of the fiber.

20. A method for making a fiber-optic polarizer comprising: providing a substrate, coupling an optical single mode fiber to the substrate, making a narrow trench across the fiber at an angle, thereby bifurcating the fiber and its core into a first fiber end having a first fiber core and a second fiber end having a second fiber core, inserting and securing a thin polarizing material of a non-laminated structure into the narrow trench, filling said narrow trench with an index-matching medium, wherein the fiber and its core is bifurcated at an angle in the range of 0 to 10 degrees relative to the perpendicular of an optical axis of the fiber, the narrow trench has a width of less than or equal to 70 μm, the polarizer has a contrast ratio greater than 30 dB.

21. A fiber-optic polarizer device comprising:
at least one optical fiber embedded in a substrate, said fiber and its core being transversely bifurcated by a narrow trench into a first fiber portion having a first fiber core and end facet, and a second fiber portion having a second fiber core and end facet, and a thin polarizing material of a non-laminated structure positioned in said narrow trench, wherein said end facets are not exposed to air.

22. The fiber-optic polarizer device according to claim 21, further comprising a cover attached to said substrate to enclose said fiber.

23. The fiber-optic polarizer device according to claim 21, further comprising an index-matching medium.

24. The fiber-optic polarizer device according to claim 21, wherein said fiber and its core is bifurcated at an angle in the range of 0 to 10 degrees, relative to a perpendicular of an optical axis of said fiber.

25. The fiber-optic polarizer device according to claim 24, wherein said fiber and its core is bifurcated at an angle in the range of 3 to 9 degrees, relative to said perpendicular of said optical axis of said fiber.

26. The fiber-optic polarizer device according to claim 21, wherein said first and second fiber cores each have a diameter that is substantially constant, varying by not more than 50%.

27. The fiber optic polarizer device according to claim 21, wherein said fiber is a single mode fiber.

28. The fiber-optic polarizer device according to claim 21, wherein said narrow trench has a width of less than or equal to 70 μm.

29. The fiber-optic polarizer device according to claim 21, wherein said narrow trench has a width of about 10–50 μm.

30. The fiber-optic polarizer device according to claim 21, wherein a return loss is measured to be 38 dB or greater.

31. The fiber-optic polarizer device according to claim 21, wherein said fiber-optic polarizer device has a contrast ratio greater than 30 dB.

32. The fiber-optic polarizer device according to claim 21, wherein said polarizing material has a thickness of about 10–50 μm.

33. The fiber-optic polarizer device according to claim 21, wherein said polarizing material is a glass exhibiting dichroic ratios up to 40 and containing silver halide particles aligned along a common axis, the glass is characterized as being either phase separable or photochromic.

34. The fiber-optic polarizer device according to claim 33, wherein said polarizing material is a photochromic glass having a composition, in weight percent on an oxide basis, consisting essentially of: 5–25% $Al_2O_3$, 14–23% $B_2O_3$, 20–65% $SiO_2$, 0–25% $P_2O_5$, 0–2.5% $Li_2O$, 0–9% $Na_2O$, 0–17% $K_2O$, 0–6% $Cs_2O$, 8–20% $Li_2O+Na_2O+K_2O+Cs_2O$, 0.004–0.02% CuO, 0.15–0.3% Ag, 0.1–0.25% Cl, and 0.1–0.2% Br, the molar ratio of alkali metal oxide:$B_2O_3$ ranges between about 0.55–0.085, where the composition is essentially free from divalent metal oxides other than CuO, and the weight ratio of Ag:(Cl+Br) ranges from about 0.65–0.95.

35. The fiber-optic polarizer device according to claim 33, wherein said polarizing material is a photochromic glass having a composition, in weight percent on an oxide basis, consisting essentially of: 4–26% $Al_2O_3$, 4–26% $B_2O_3$, 40–76% SiO2, and at least one alkali metal oxide selected from the group of 2–8% $Li_2O$, 4–15% $Na_2O$, 6–20% $K_2O$, 8–25% $Rb_2O$, and 10–30% $Cs_2O$; at least one halogen in a minimum effective proportion of 0.2% Cl, 0.1% Br, and 0.08% I, and a minimum of silver in a proportion of 0.2%, where the effective halogen is Cl, 0.05% where the effective halogen is Br; but the glass contains at least 0.08% I, the sum of the base glass components, halogen, and silver constitute at least 85% by weight of the composition.

36. The fiber-optic polarizer according to claim 33, wherein said polarizing material is a phase separable glass having a base composition, in weight percent, consisting essentially of: 1–15% $Al_2O_3$, 20–35% $B_2O_3$, 5–12% alkali metal oxide, and the remainder $SiO_2$, with a proviso that where $Al_2O_3$ is present in amounts greater than about 5%, at least 1% of a phase separating agent will be included in the composition.

37. The fiber-optic polarizer device according to claim 21, wherein said polarizing material is a polarizing glass that exhibits a contrast ratio greater than 25 dB at a wavelength greater than 650 nm.

38. The fiber-optic polarizer according to claim 37, wherein said polarizing material contains elongated metallic particles, each with a long axis, and preferentially absorbs a polarized component of light that is parallel to said long axis for high transmittance of light polarized perpendicular to said long axis.

39. The fiber-optic polarizer according to claim 37, wherein the polarizing material containing metallic silver particles.

40. The fiber-optic polarizer according to claim 21, wherein the polarizing material is a polarizing glass made according to a method comprising the steps of:
  (a) providing a polarizing glass comprising a first polarizing layer and a non-polarizing region, wherein said polarizing layer contains elongated metal particles and said non-polarizing region contains metal halide particles;
  (b) bonding saidfirst polarizing layer of said polarizing glass to a substrate;
  (c) removing said non-polarizing region to expose said first polarizing layer; and
  (d) separating said first polarizing layer from said substrate to form an ultra-thin polarizing glass.

41. The method according to claim 21, wherein said polarizing material is a polarizing glass polarizing glass is made according to a method comprising the steps of:
  (a) providing a polarizing glass comprising a first polarizing layer and a non-polarizing region, wherein the polarizing layer contains elongated metal particles and the non-polarizing region contains metal halide particles;
  (b) bonding the first polarizing layer of the polarizing glass to a substrate;
  (c) removing the non-polarizing region to expose said first polarizing layer; and
  (d) separating the first polarizing layer from the substrate to form an ultra-thin polarizing glass, the fibers do not require specialized treatment to expand their respective core diameters.

* * * * *